United States Patent [19]

Kellerman

[11] Patent Number: 5,783,753
[45] Date of Patent: Jul. 21, 1998

[54] VANE ANEMOMETER HAVING A MODULAR IMPELLER ASSEMBLY

[75] Inventor: Richard Kellerman, Media, Pa.

[73] Assignee: Nielsen-Kellerman Company, Chester, Pa.

[21] Appl. No.: 837,376

[22] Filed: Apr. 17, 1997

[51] Int. Cl.[6] ............................................. G01F 1/115
[52] U.S. Cl. .......................... 73/861.94; 73/861.92; 73/170.11
[58] Field of Search ............. 73/170.07, 170.08, 73/170.11, 861.85, 861.91, 861.92, 861.94

[56] References Cited

U.S. PATENT DOCUMENTS

| | | | |
|---|---|---|---|
| 3,387,491 | 6/1968 | Adams | 73/170.11 |
| 3,695,106 | 10/1972 | Geisow | 73/861.92 X |
| 3,713,336 | 1/1973 | Bernstein et al. | 73/170.08 X |
| 3,823,611 | 7/1974 | Rudow et al. | 73/231 R |
| 4,078,426 | 3/1978 | Casani et al. | 73/189 |
| 4,091,667 | 5/1978 | Anderson et al. | 73/170 R |
| 4,241,605 | 12/1980 | Hendriks et al. | 73/861.94 |
| 4,463,613 | 8/1984 | Schmittner et al. | 73/861.94 X |
| 4,548,074 | 10/1985 | Krueter | 73/861.85 X |
| 5,038,607 | 8/1991 | Baer et al. | 73/861.85 X |
| 5,157,841 | 10/1992 | Dinsmore | 33/361 |
| 5,233,759 | 8/1993 | Gloor et al. | 33/355 R |
| 5,303,578 | 4/1994 | Williams et al. | 73/54.24 |
| 5,361,633 | 11/1994 | Peet, II | 73/170.08 |
| 5,383,280 | 1/1995 | McDermott | 33/361 |
| 5,505,082 | 4/1996 | Cushman et al. | 73/170.21 |
| 5,510,940 | 4/1996 | Tacklind et al. | 360/106 |
| 5,535,619 | 7/1996 | Brookfield | 73/54.33 |

FOREIGN PATENT DOCUMENTS

| | | | |
|---|---|---|---|
| 2097542 | 11/1982 | United Kingdom | 73/861.92 |
| 2127972 | 4/1984 | United Kingdom | 73/861.85 |

*Primary Examiner*—Elizabeth L. Dougherty
*Attorney, Agent, or Firm*—Woodcock Washburn Kurtz Mackiewicz & Norris, LLP

[57] ABSTRACT

A vane anemometer is disclosed in which a modular vane assembly is removably mounted within the case of the instrument. Within the modular vane assembly is a rotatably mounted impeller shaft. The impeller assembly preferably can be removed and inserted into a cavity of the anemometer without the use of tools. Consequently, if the impeller, bearings or other components of the impeller assembly should become damaged, the modular impeller assembly can be quickly and easily replaced. The modular impeller assembly is preferably mechanically insulated from the anemometer casing. This minimizes the effect of dynamic forces on the bearings and other components of the impeller assembly. A method of and the structure for precisely and reproducibly adjusting the axial clearance between a shaft and a bearing assembly is also disclosed.

27 Claims, 5 Drawing Sheets

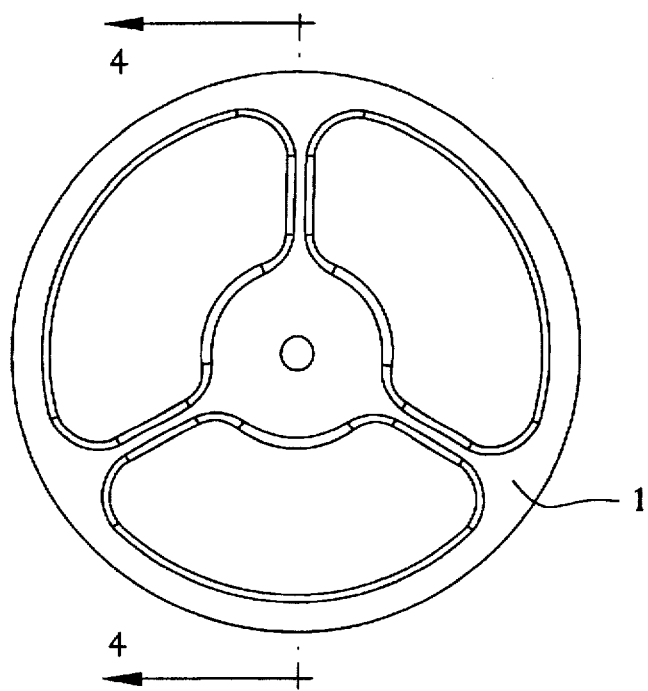
FIG. 3
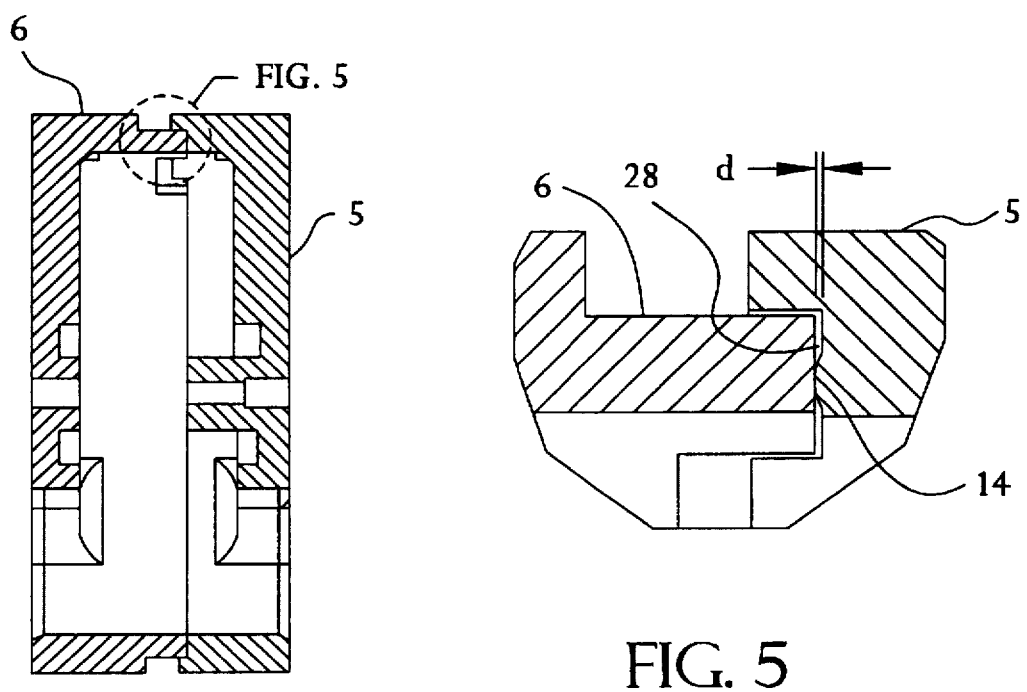
FIG. 4
FIG. 5

VANE ANEMOMETER HAVING A MODULAR IMPELLER ASSEMBLY

FIELD OF THE INVENTION

The present invention relates to portable vane anemometers intended for making air speed measurements in a variety of applications and locations with high accuracy and over a wide range of speeds. In particular, this invention relates to portable vane anemometers that have replaceable, modular impeller assemblies. In accordance with preferred embodiments, this invention relates to vane anemometers having axial clearance between an impeller shaft and a bearing that can be easily set without the use of an adjustable bearing and without an adjustment made by a skilled operator.

BACKGROUND OF THE INVENTION

Conventionally, a vane anemometer has an impeller mounted on a shaft. Flow of air through the impeller produces rotation of the shaft; the speed of rotation of the shaft is indicative of the air speed. Rotation of the shaft is then measured by a known mechanical or electrical means. In many applications, vane anemometers are required to be highly accurate. If significant frictional forces are present, such as between the shaft and its bearings, some of the work produced by the air flow will be used to overcome this frictional force. Work used to overcome frictional forces will not be converted into shaft rotation. Such that, the measured speed will be less than the true air speed. Since frictional forces may be more pronounced at low speeds, the usefulness of an anemometer at low air speeds may be limited if the effects of friction are not minimized.

Typically, the effects of frictional forces are minimized by mounting the rotatable shaft in precision bearings. Since precision bearings minimize friction, the speed of rotation of the impeller shaft more closely approximates the true air speed. Frictional forces may be reduced employing sapphire "V" bearings in conjunction with hardened steel shafts having small spherically shaped tips at either of its axial ends. When the proper axial clearance is provided between the axial ends of the shaft and the bearings, the spherical tips roll around the V of the jeweled bearing and thereby reduce friction between these components. As will be appreciated by those skilled in the art, if the axial clearance is not set properly, the effects of friction will not be minimized because the shaft tips will contact the respective bearings excessively. Examples of vane anemometers using such bearings are the "TurboMeter" manufactured by Davis Instruments of Hayward, Calif., and the "Sky Watch Fun." available from Flytec USA, of Miami, Fla.

Although jewel bearings reduce friction, they have several disadvantages. For instance, one disadvantage of sapphire bearing assemblies is the tendency for the tip of the impeller shaft to suffer wear in response to the forces generated by the various loads imposed upon it. At higher wind speeds, wear can be significant and can lead to a significant degradation in accuracy. A further disadvantage of jewel bearing assemblies is vulnerability to damage caused by mechanical shock. For this reason, some companies provide such bearings with cushioned supports in order to limit shock loads. Bearings of this type are available from Bird Precision, of Waltham, Mass.

Yet another disadvantage of jewel bearings is the requirement to provide a precise axial clearance between the ends of the shaft and the bottom of the V jewel, and the necessity to provide a means to set and hold this clearance. Typically, jewel bearings are adjustable and the axial clearance is set by a skilled operator. For instance, the bearings may be threaded to the anemometer, so that, the position of the bearings relative to the shaft can be either retracted or advanced as needed. Adjustable jewels of this type are also available from Bird Precision.

One more disadvantage of jewel bearings is their susceptibly to contamination, which can also give rise to a loss of accuracy. For example, if a contaminant enters the area between the shaft end and the bearing, it will interfere with rotation of the shaft and damage the bearing. The disadvantages listed above are not limited to anemometers having jewel bearings. Ball or needle bearings are also subject to contamination, wear and damage.

If a jewel bearing or other type of bearing should fail due to either wear, mechanical shock, interference by contaminants or other causes, it will have to be either repaired or replaced. In most instances, these bearings are housed within the anemometer and are not easily accessible. Consequently, if the bearings should fail, typically the entire anemometer must be replaced. This can be expensive. Furthermore, even if the bearings are accessible, they typically cannot be replaced by the average user because replacing them involves setting the proper axial clearance as described above and requires particular skill.

The advantages of a durable vane anemometer, the disadvantage of bearings employed in anemometers and the need for an anemometer that can be relatively easily repaired is well known. For example, in U.S. Pat. No. 3,823,611 issued to Rudow, the advantage of an anemometer that is economically assembled and easily serviced is noted. Furthermore, in U.S. Pat. No. 4,078,426 issued to Cassini, the patentee describes a vane anemometer intended to address the problem of bearing wear and the necessity to replace the bearing one or more times during the desired useful life of the instrument.

Accordingly, it is desirable for a vane anemometer to have a bearing assembly that can easily be replaced. Furthermore, a vane anemometer that can be constructed without requiring a skilled operator to set the proper axial clearance between the bearings and the shaft is needed. An improved vane anemometer that mechanically insulates the bearings from shock loads or dynamic forces is also needed.

SUMMARY OF THE INVENTION

According to the present invention, vane anemometers are provided including a casing and a modular impeller assembly. The modular impeller assembly may be quickly and simply removed from the anemometer casing and replaced with a new impeller assembly without the aid of tools. In this manner, any loss in accuracy due to bearing wear, or other damage to the impeller assembly, such as the ingestion of contaminants, can be quickly and simply remedied.

Preferably, the modular impeller assembly has a rotatable shaft upon which is mounted an impeller. The shaft and the impeller may be mounted in a cage assembly. More particularly, the shaft may be mounted in a bearing at either of its axial ends, preferably jewel bearings. Within the casing of the anemometer may be a cavity into which the impeller assembly can be inserted and removed without the use of tools.

In order to insulate the impeller from mechanical shock and dynamic forces, the impeller assembly preferably has an elastomeric or other shock absorbing material running around its periphery. Within the cavity of the casing may be a groove upon which the elastomeric material can be mated.

By mating the impeller assembly to the casing in this fashion, the elastomeric material provides mechanical insulation from dynamic forces. For example, if the anemometer is dropped, the sensitive components of the impeller assembly, such as the jewel bearings, are protected from mechanical shock.

In a preferred embodiment of this invention, the impeller assembly has a magnet mounted on the shaft and an inductor and a microprocessor disposed within the casing. As wind causes rotation of the impeller, the shaft and its attached magnet rotate in relation to the wind speed. Rotation of the magnet and its associated magnetic field induces a current in the inductor that is indicative of the wind speed. The current produced by the inductor is then sent to the microprocessor. Within the microprocessor, the wind speed is calculated. The wind speed may be displayed in an LCD display disposed on the casing. Furthermore, the anemometer may have a key pad arranged on the casing to control the operation of the microprocessor.

The impeller assembly may have two cages that can be mated, so that, the axial clearance between the impeller shaft and the bearings can be properly and easily established. One of the two cages may have a plurality of protrusions that can be mated with recesses on the other cage. Upon mating the protrusions with the recesses, there is little or no axial clearance between the shaft and the bearings. After mating the cages, the cages are rotated relative to one another. This causes the protrusions to exit their respective recesses. As they exit the recesses, the protrusions push against a mating surface of the other cage and thereby cause the cages to separate by a distance equal to the length of the protrusions. Upon separating the cages by the length of the protrusions, the shaft is also separated from the bearings at either end by a distance that is approximately equal to the length of the protrusions. More particularly, the sum of the distance each end is separated from its respective bearing is equal to the length of the protrusions. Thus, by selecting the proper length of the protrusions, the proper axial clearance between the ends of the shaft and the bearings can be set without the use of a skilled operator and an adjustable bearing.

BRIEF DESCRIPTION OF THE DRAWINGS

FIG. 3 is a plan view of one component of the preferred embodiment depicted in FIG. 1;

FIG. 4 is a cross sectional view taken along line 4—4 of FIG. 3;

FIG. 5 is an enlarged view of one aspect of the component depicted in FIG. 4;

Referring now to the drawings, wherein like reference numerals designate corresponding structure throughout the views, and referring in particular to FIG. 1, there is shown a vane anemometer 15. The vane anemometer 15 is preferably small enough so that it is portable and can be held in a single hand. In a preferred embodiment, the vane anemometer 15 includes a casing 20 and a removable modular impeller assembly 1. Preferably, the casing 20 is manufactured using a molding process. However, other known techniques of manufacturing may be employed. Additionally, the casing 20 is preferably constructed from plastic. Again other suitable materials may be used. As illustrated in FIG. 6, the casing 20 has a cavity 17 for receiving the modular impeller assembly 1. FIG. 1 depicts the modular impeller assembly 1 mounted in the cavity 17. Preferably, the cavity 17 and the impeller assembly 1 are substantially cylindrical in shape.

Housed within the casing may be a microprocessor and its associated electrical circuits. The microprocessor functions, as described in further detail below, to compute wind speed. Disposed within the casing may be an output display 3 and a keypad 24. The display may be of the digital variety and even more specifically of the LCD type. As is typical, the keypad communicates with the microprocessor to input signals from the user. For example, the mode of operation of the anemometer may be controlled with the keypad 24. Such modes may include, among others, calculation and display of a maximum wind speed, an instantaneous wind speed and/or an average wind speed.

Figure 2:
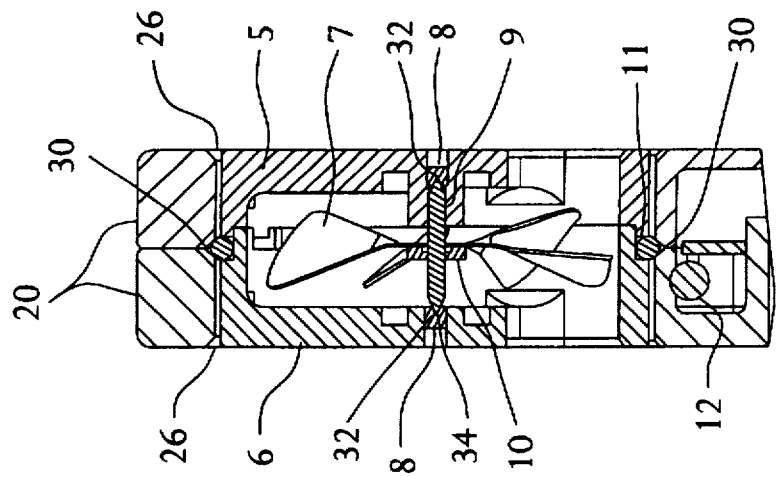
FIG. 2 is an enlarged section view through line 2—2 of FIG. 1.
Figure 1:
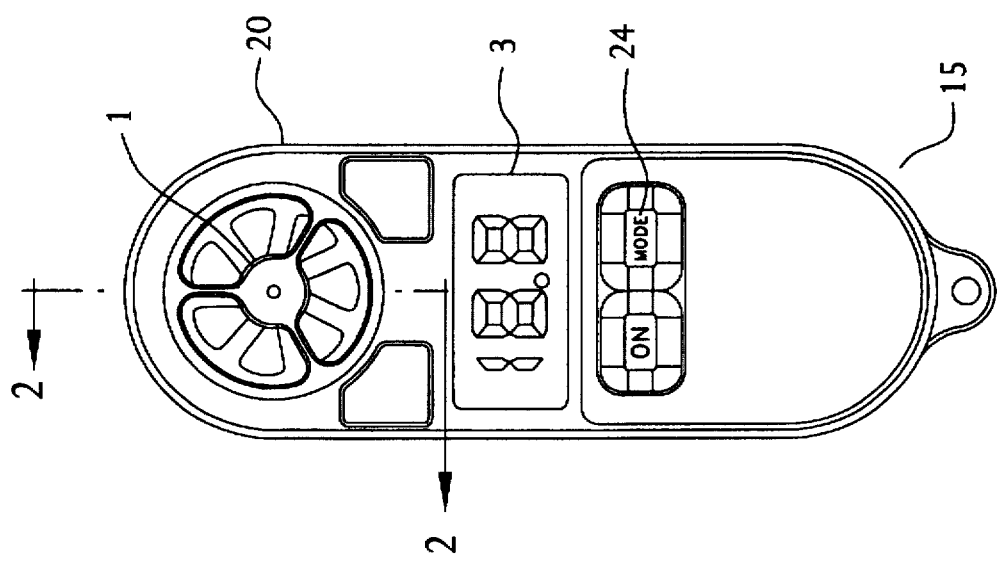
FIG. 1 is a front view of a vane anemometer according to a preferred embodiment of this invention.
Figure 6:
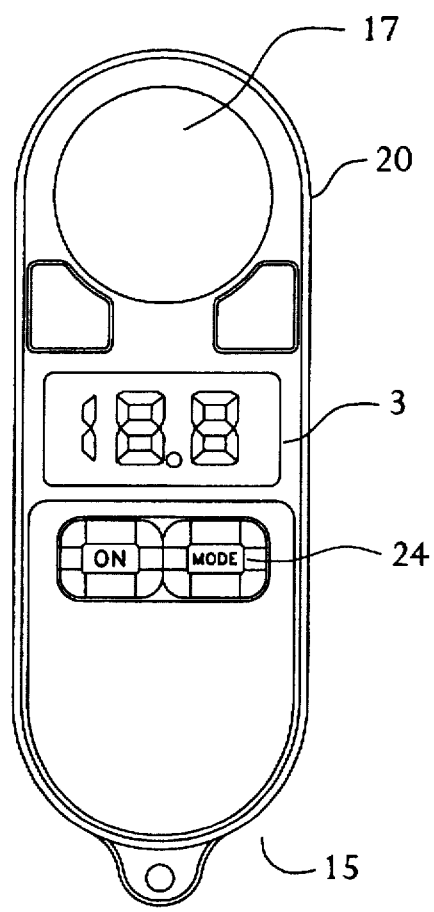
FIG. 6 is a front view of the vane anemometer of FIG. 1 with the modular impeller assembly removed.

FIGS. 2–4 identify the principal parts of the impeller assembly 1. These components preferably include a first cage 5, a second cage 6, a rotatably mounted impeller 7, two V-jewel bearings 8, a shaft 9, and a magnet 10. In a preferred embodiment, the shaft 9 is constructed from hardened steel. Additionally, the magnet 10 and the impeller 7 are mounted on the shaft 9. They may be press fit onto the shaft 9 or attached by other known methods, such as with use of an adhesive. The shaft 9 may have spherical shaped tips 32 at either of its axial ends as is conventional with many impeller shafts.

Disposed within each cage is a bearing 8 upon which either axial end of the shaft 9 is mounted. Preferably, these bearings are jewel bearings with a V-groove 34. The spherical shaped tips 32 of the shaft roll in the V-groove 34 of the bearings to minimize friction between the shaft and the bearings. Bearings of this type are well known in the art. For example, as mentioned above they are produced by Bird Precision of Waltham, Mass. Since the speed of rotation of the shaft 9 is used to convert air speed into an electrical current so that it can be quantified, ideally there would be no friction between the shaft and the bearings. Any friction between these components causes the measured air speed to differ from the actual air speed. Since as is known in the art, the amount of friction between a jewel bearing and the shaft is relatively low, jewel bearings are typically employed to minimize the effects of friction.

Figure 9:
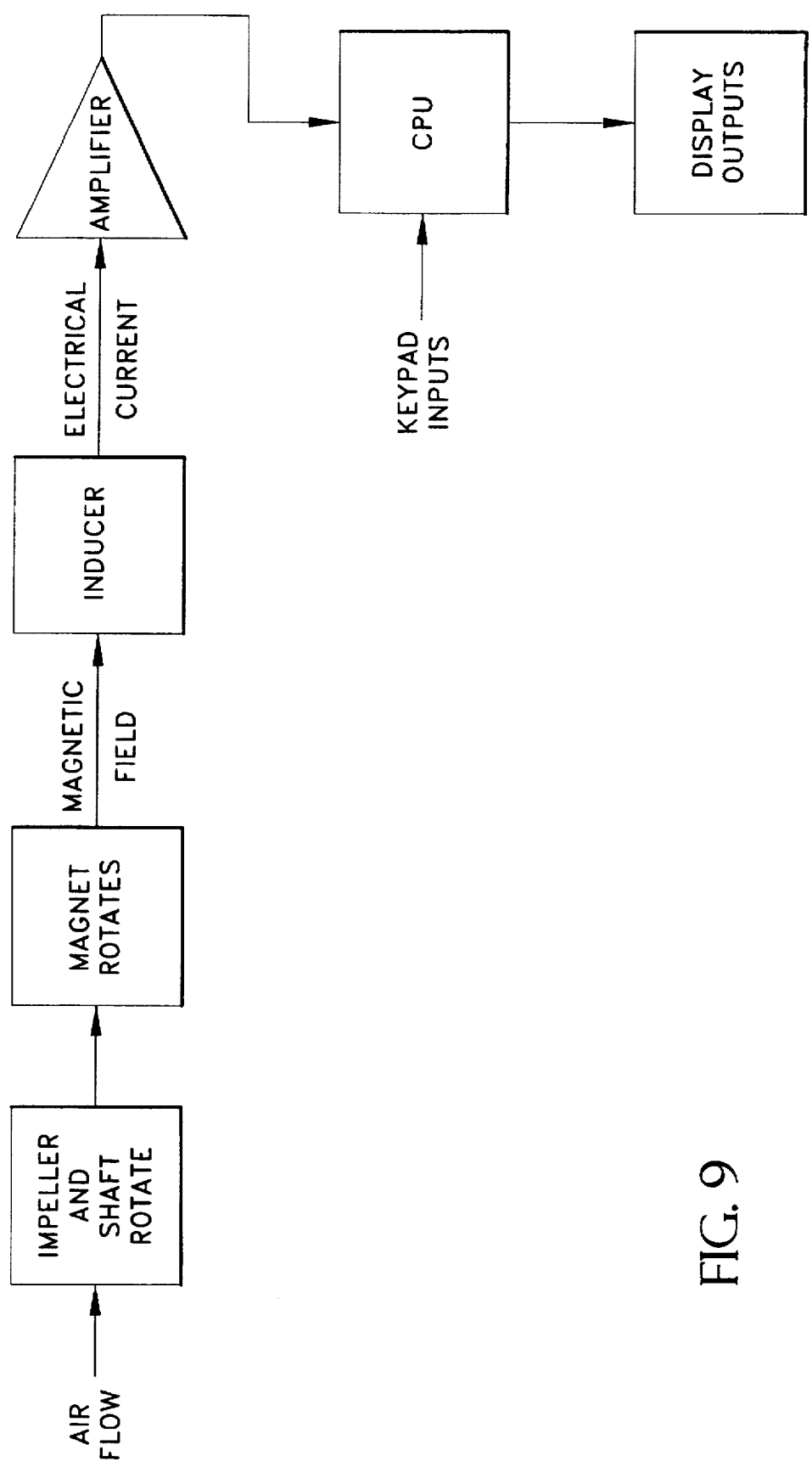
FIG. 9 is a schematic diagram of the anemometer depicted in FIG. 1.

As depicted in FIG. 2, disposed within the casing 2 is an inductor 12. The inductor 12 is in electrical communication with the microprocessor. In one preferred embodiment the inductor 12 is a pick up coil. The magnet 10 is preferably cylindrical in shape and magnetized across its diameter. In operation, as depicted schematically in FIG. 9, the impeller 7 rotates in response to airflow. Since the shaft 9 is rotatably mounted in the bearings 8 and attached to the impeller 7, it rotates in relation to the air flow. Moreover, the magnet 10 rotates with the shaft 9. Rotation of the magnet 10 causes the magnetic field received by the inductor 12 to vary in magnitude. This induces an electrical current in the inductor 12 that is transmitted by electrical conductors to the microprocessor. Prior to being received by the microprocessor, the current may be amplified by a conventional amplifier. After receiving the output of the amplifier, the microprocessor computes the air speed. The processor also drives a digital display 3, allowing the user to read the wind speed. The details of the amplifier, processor and display units will be familiar to anyone skilled in the art.

Since the magnet rotates in relation to the wind speed, the variation in the magnetic field produced by the rotation of the magnet is indicative of the wind speed. Furthermore, since the electrical current induced in the inductor is proportional to the variation in the magnetic field, the electrical current sent to the microprocessor is indicative of the wind speed. The induced current is proportional to the variation in the magnetic field. As used here, the term proportional does not signify a linear or fixed relationship. Rather, this term indicates that as the time rate of change of the magnetic field increases the magnitude of the current induced increases.

Figure 8:
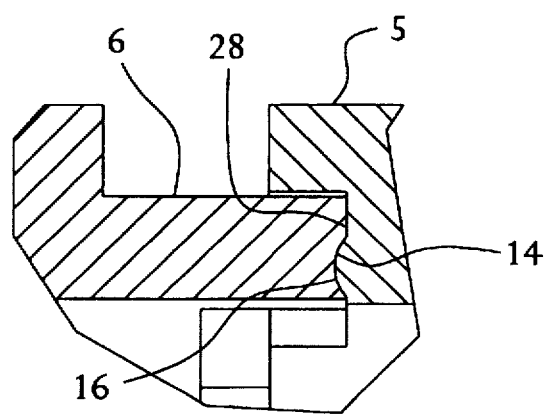
FIG. 8 is an enlarged view of one aspect of the cross section depicted in FIG. 7.

The anemometer of the present invention can be manufactured without the use of adjustable jewel bearings and the axial clearance of the bearings can be set without the aid of a skilled manufacturer. In order to accomplish these features, one of the cages, which in the preferred embodiment shown is the first cage 5, has a plurality of protrusions 14 extending from its mating surface, as is best shown in FIGS. 5 and 8. Additionally, the other cage, which in the preferred embodiment is the second cage 6, has a plurality of recesses 16 in its mating surface 28, as is also best shown in FIGS. 5 and 8. Although only one protrusion and one recess is shown in these figures, it will be appreciated that the impeller assembly 1 may have a plurality of protrusions and recesses. In a preferred embodiment, the impeller assembly has three protrusions and recesses.

Figure 7:
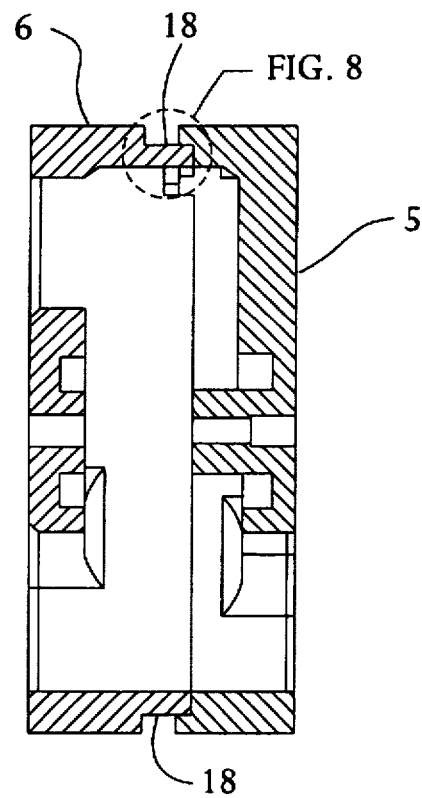
FIG. 7 is a cross sectional view of a component depicted in FIG. 2.

To begin the manufacturing process, a jewel bearing 8 is press fitted into one of the cages, which in the preferred embodiment is the first cage 5. Although the preferred method of attaching the jewel bearings 8 is an interference fit, other known methods of attaching the jewel bearing, such as an adhesive may be used. One axial end of the shaft 9 with the impeller 7 and the magnet 10 mounted around its circumference is then inserted into the attached jewel bearing 8 in the first cage 5. Prior to mounting the shaft 9, the impeller 7 and the magnet 10 are mounted around the circumference of the shaft 9. The first cage 5 is then assembled to the second cage 6, but not yet secured to it. More specifically, the three protrusions 14 extending from the first cage 5 are mated with the three recesses 16 in the second cage 6, as is best seen in FIGS. 7 and 8. The second jewel 8 is then seated on the other axial end of the shaft 9 so that there is essentially zero axial clearance between the ends of the shaft 9 and the bearings 8. Through the use of an adhesive, the second jewel 8 is then rigidly affixed to the second cage 6.

The first and the second cages are then rotated in opposite directions relative to each other. As the cages 5,6 are rotated, the three protrusions 14 come out of their respective recesses 16 and contact the mating surface 28 of the second cage 6. When this occurs, the cages 5,6 are driven apart by the distance "d," which is the distance the protrusions extend from the first cage. The arrangement of the cage at this stage of the assembly is shown in FIGS. 4 and 5. As the cages are separated by the distance "d," it will be appreciated that the shaft 9 becomes separated from the bearings by the distance "d." Since the distance "d" the protrusions 14 extend from the first cage 5 corresponds to the proper axial clearance between the shaft and the bearings, the clearance is set when the cages 5,6 are separated by the protrusions 14. Alternatively stated, the distance "d" that the cages 5,6 are driven apart corresponds to the sum of the axial clearance between each bearing and its respective end of the shaft 9. After the shaft has been separated from the bearings by the distance "d," no further adjustment of the bearings is needed in order to provide the proper axial clearance. Thus, in this invention the axial clearance can be set without the use of an adjustable bearing and a skilled operator is not needed to set the requisite axial clearance.

Following the setting of the axial clearance, the cages 5,6 are affixed to each other by preferably either adhesive bonding or solvent welding. However, other similar means may be employed. An elastomeric material 11 is then placed around the circumference of the assembly. In the preferred embodiment illustrated, the elastomeric material 11 is shaped in the form of an o-ring that runs around a channel 18 between the first cage and the second cage, as best seen in FIG. 2. The o-ring may be affixed to the channel 18 with an adhesive. With the o-ring installed, the modular impeller assembly 1 can be inserted into the cavity 17 of the casing 20.

As best seen in FIG. 2, the diameter of the impeller assembly 1 at the point where the o-ring is installed is greater than the diameter of the impeller assembly 1 at other locations. The diameter of the impeller assembly 1 in areas other than where the o-ring is installed is small enough relative to the diameter of the cavity 17, so that, the walls of the cages 5,6 either do not contact the walls of the cavity 17 when the impeller assembly is placed in the cavity 17 or contact the walls only slightly (not enough contact to create an interference fit). However, the diameter of the impeller assembly 1 at the point where the o-ring is installed is larger than the diameter of the cavity 17. Consequently, when the impeller assembly 1 is inserted into the cavity 17, the o-ring is compressed and an interference fit between the impeller assembly 1 and the casing 20 is provided.

In the preferred embodiment depicted in FIG. 2, the casing 20 may have a chamfered edge 26 along the top and the bottom of the cavity 17 for receiving the impeller assembly 1, as best shown in FIG. 2. Additionally, the casing 20 may have a groove, which is preferable a "v" shaped groove 30, running around the cavity 17. As the impeller assembly 1 is inserted, the o-ring is compressed along the sides of the cavity 17. Eventually, upon insertion, the o-ring reaches the groove 30 and is compressed in the groove 30. At this point, the impeller assembly has been inserted into the casing 20. The fit between the impeller assembly 1 and the casing 20 is tight enough, so that, the impeller assembly cannot be removed from the casing unless direct pressure is applied to the impeller assembly. More specifically, if the impeller assembly 1 is dropped or shaken the impeller assembly 1 will not become separated from the casing 20. However, the amount of pressure required to insert and remove the impeller assembly 1 is low enough that the impeller assembly 1 can be inserted and removed by hand without the use of tools.

Because the O-ring is compliant, it provides some mechanical isolation between the casing 2 and the impeller assembly 1. More specifically, the o-ring provides some mechanical isolation, so that, in the event a dynamic force is applied to the casing, for instance if the anemometer is dropped, the dynamic force will be dampened by the o-ring and the force transmitted to the bearings and the shaft will be significantly less. Since as described above jewel bearings are very sensitive and any damage to either the bearings or the shaft can effect the performance of the anemometer, this is one, but certainly not the only significant feature of the invention.

As mentioned above, some prior art vane anemometers have adjustable bearings and even more particularly adjustable jewel bearings. The bearings are adjustable so that the precise axial clearance between each bearing and the respective axial end of the shaft can be maintained. For example, jewel bearings manufactures by Bird Precision of Waltham, Mass. are adjustable. These adjustable bearings are threaded to the anemometer and require a skilled operator to adjust them and set the proper clearance. Since as described above, the axial clearance of the vane anemometer of this invention can be set without a skilled operator having to adjust the bearings to set the proper axial clearance, the anemometer of this invention has a distinct advantage over those of the prior art.

Although a certain embodiment of the present invention has been illustrated above, that embodiment is for the purposes of illustration only and is not meant to limit the scope of the present invention. Upon review of the forgoing specification those of ordinary skill will immediately realize numerous adaptations and modifications of the disclosed system. Therefore, in order to ascertain the scope of the present invention, attention is directed to the appended claims.

What is claimed:

1. A vane anemometer, comprising:
   a casing that encloses a microprocessor that calculates wind speed; and
   a modular impeller assembly, removably inserted into the casing, comprising a periphery, an elastomeric material running around the periphery, an impeller mounted on a rotatable shaft and a magnet mounted on the rotatable shaft, such that wind causes rotation of the impeller, the magnet and the shaft, said rotation of the magnet producing an electrical signal proportional to the wind speed and the electrical signal being receivable by said microprocessor.

2. The vane anemometer of claim 1 wherein the modular impeller assembly further comprises a first cage sealed to a second cage and the shaft is rotatably mounted within the first and second cages.

3. The vane anemometer of claim 1, further comprising a display mounted to the casing for indicating the wind speed as calculated by the microprocessor.

4. The vane anemometer of claim 1 wherein the shaft has a first and a second axial end each mounted in a jewel bearing.

5. The vane anemometer of claim 1 wherein the modular impeller assembly can be inserted into and removed from the casing without the aid of tools.

6. The vane anemometer of claim 1 wherein the casing further comprises an inductor that the magnet induces a current into when it rotates with the shaft.

7. The vane anemometer of claim 1 wherein the casing further comprises a cavity for receiving the impeller assembly and the cavity has a groove for receiving the elastomeric material running around the periphery of the impeller assembly.

8. The vane anemometer of claim 1, wherein the impeller assembly further comprises a first and a second cage, the first cage having a plurality of protrusions separating the first cage from the second cage by a length of the protrusions and a sum of a first axial clearance between a first bearing and a first end of the shaft and a second axial clearance between a second bearing and a second end of the shaft approximately equals the length of the protrusions.

9. A vane comprising:
   a casing having a cavity; and
   a modular impeller assembly that can be inserted and removed from the cavity without the use of tools comprising a periphery, an elastomeric material running around the periphery, an impeller rotatable mounted on a shaft and a magnet rotatably mounted on the shaft, the impeller driving the shaft and the magnet to rotate in response to air flow and the rotation of the magnet produces an electrical signal in the casing indicative of the speed of the air flow.

10. The vane anemometer of claim 9, wherein the casing further comprises an inductor that the magnet induces an electrical current into when the inductor rotates with the shaft.

11. The vane anemometer of claim 9, wherein the impeller assembly is mounted to the casing with an interference fit between the impeller assembly and the cavity.

12. The vane anemometer of claim 9, wherein the cavity has a groove for receiving and compressing the elastomeric material running around the periphery of the impeller assembly so that compression of the elastomeric material provides an interference fit between the impeller assembly and the cavity.

13. A method of constructing a vane anemometer comprising the steps of:
   installing a first bearing into a first cage;
   inserting a rotatable shaft having an impeller into the first bearing;
   sealing a second cage to the first cage to form a modular impeller assembly; and
   placing the modular impeller assembly into a cavity in the anemometer without the use of tools.

14. The method of claim 13, wherein the step of placing comprises the step of compressing an elastomeric material running around an exterior of the impeller assembly into a groove running around an interior of the cavity.

15. The method of claim 13, wherein the step of sealing further comprises the step of mating a plurality of protrusions extending from the first cage with a plurality of recesses in the second cage.

16. The method of claim 13, wherein the step of sealing further comprises the step of affixing the first cage to the second cage with an adhesive.

17. The method of claim 14, further comprising the step of mounting a second bearing to the shaft.

18. The method of claim 15, wherein the step of sealing further comprises the step of separating the first cage from the second cage by a length of the protrusions and a sum of an axial clearance between the first bearing and a first end of the shaft and an axial clearance between a second bearing and a second end of the shaft approximately equals the length of the protrusions.

19. A vane anemometer comprising:
   a casing comprising a cavity; and
   a modular impeller assembly that can be inserted and removed from the cavity without the use of tools, comprising:
   an impeller rotatably mounted on a shaft, the shaft having a first and a second axial end each end being mounted respectively within a first and a second bearing and having an axial clearance between each end and its respective bearing; and
   a first and a second cage, the first cage having a plurality of protrusions separating the first cage from the second cage by a length of the protrusions and a sum of the axial clearance between the first bearing and the first end of the shaft and the axial clearance between the second bearing and the second end of the shaft approximately equaling the length of the protrusions.

20. The vane anemometer of claim 19, wherein the first and second bearings comprise jewel bearings.

21. The vane anemometer of claim 19, wherein the impeller assembly further comprises an elastomeric material running around an exterior of the impeller assembly and compressed between the impeller assembly and the cavity.

22. The vane anemometer of claim 21, wherein the casing further comprises a groove running around the cavity into which the elastomeric material is received.

23. A vane anemometer, comprising:

a casing that encloses a microprocessor that calculates wind speed; and a modular impeller assembly, removably inserted into the casing, comprising a first cage sealed to a second cage, a shaft rotatably mounted to the first cage and the second cage, an impeller rotatably mounted to the shaft and a magnet rotatably mounted to the shaft, so that rotation of the magnet on the shaft produces an electrical signal that is indicative of the wind speed and that is receivable by the microprocessor.

24. The vane anemometer of claim 23, wherein the modular impeller assembly further comprises an elastomeric material running around a periphery of the modular impeller assembly.

25. The vane anemometer of claim 23, wherein the casing further comprises a cavity for receiving the modular impeller assembly and the cavity has a groove for receiving an elastomeric material that runs around a periphery of the impeller assembly.

26. The vane anemometer of claim 23, wherein the first cage has a plurality of protrusions separating the first cage from the second cage by a length of the protrusions and a sum of a first axial clearance between a first bearing and a first end of the shaft and a second axial clearance between a second bearing and a second end of the shaft approximately equals the length of the protrusions.

27. The vane anemometer of claim 23, wherein the casing further comprises an inductor that the magnet induces a current into when it rotates with the shaft.

* * * * *